United States Patent [19]
Kain

[11] Patent Number: 6,030,047
[45] Date of Patent: Feb. 29, 2000

[54] CHILD VEHICLE SEAT WITH CHILD-RESTRAINT HARNESS ADJUSTMENT MECHANISM

[75] Inventor: James M. Kain, Tipp City, Ohio

[73] Assignee: Cosco, Inc., Columbus, Ind.

[21] Appl. No.: 09/055,553

[22] Filed: Apr. 6, 1998

Related U.S. Application Data

[60] Provisional application No. 60/041,914, Apr. 7, 1997.

[51] Int. Cl.[7] .................................................... B60N 2/28
[52] U.S. Cl. ...................................... 297/484; 297/250.1
[58] Field of Search ................................ 297/250.1, 483, 297/484, 468

[56] References Cited

U.S. PATENT DOCUMENTS

| | | |
|---|---|---|
| 2,143,634 | 1/1939 | Saunders . |
| 3,198,575 | 8/1965 | Hawkins . |
| 3,572,827 | 3/1971 | Merelis . |
| 3,948,556 | 4/1976 | Hyde et al. . |
| 4,040,664 | 8/1977 | Tanaka et al. ........................ 297/484 X |
| 4,047,755 | 9/1977 | McDonald et al. . |
| 4,058,342 | 11/1977 | Ettridge . |
| 4,168,050 | 9/1979 | Nerem et al. . |
| 4,205,877 | 6/1980 | Ettridge . |
| 4,376,551 | 3/1983 | Cone . |
| 4,545,617 | 10/1985 | Drexler et al. . |
| 4,632,456 | 12/1986 | Kassai . |
| 4,709,960 | 12/1987 | Launes . |
| 4,790,601 | 12/1988 | Burleigh et al. ......................... 297/484 |
| 4,854,639 | 8/1989 | Burleigh et al. ..................... 297/410 X |
| 4,858,997 | 8/1989 | Shubin ................................ 297/484 X |
| 4,915,446 | 4/1990 | Darling et al. . |
| 4,936,629 | 6/1990 | Young . |
| 4,971,392 | 11/1990 | Young . |
| 5,181,761 | 1/1993 | Meeker . |
| 5,335,964 | 8/1994 | Sedlack et al. . |
| 5,344,213 | 9/1994 | Koyanagi . |
| 5,468,046 | 11/1995 | Weber et al. ........................ 297/484 X |
| 5,527,094 | 6/1996 | Hiramatsu et al. . |
| 5,609,393 | 3/1997 | Meeker et al. . |
| 5,775,772 | 7/1998 | Lefranc ................................ 297/485 X |

FOREIGN PATENT DOCUMENTS

2 282 321   4/1995   United Kingdom .

*Primary Examiner*—Peter R. Crown
*Attorney, Agent, or Firm*—Barnes & Thornburg

[57] ABSTRACT

A child-restraint seat for a vehicle comprising a seat shell including a bottom seat portion, a back support portion and a child-restraint harness wherein a harness-control panel positioned to lie adjacent to a front surface of the back support portion to cause a child seated in the seat shell to rest against the harness-control panel and formed to receive a shoulder belt portion of the child-restraint harness is mounted on the seat shell for up and down movement relative to the seat shell to raise and lower the shoulder belt portion of the child-restraint harness with respect to the bottom seat portion to harness small-sized children and large-sized children in a restrained position in the seat shell.

41 Claims, 7 Drawing Sheets

CHILD VEHICLE SEAT WITH CHILD-RESTRAINT HARNESS ADJUSTMENT MECHANISM

This application claims benefit of provisional application No. 60/041,914, filed Apr. 7, 1997.

BACKGROUND AND SUMMARY OF THE INVENTION

The present invention relates to seats for use by children in vehicles and, particularly, to seats having child-restraining harness belts and to seats configured to seat older children in a restrained fashion using adult vehicle lap and shoulder belts. More particularly, the present invention relates to a child vehicle seat with a child-restraint harness adjustment mechanism and to a child vehicle seat with a headrest adjustment mechanism.

Many child car seats are formed to include several sets of shoulder belt-receiving apertures in a back wall of the car seat so that the car seat can be adapted by a user to restrain children of different sizes. To accommodate an infant, the two shoulder belts are uncoupled from other portions of the car seat harness, passed through a lowest pair of shoulder belt-receiving apertures formed in the back wall of the car seat, and then recoupled to the car seat harness.

As the infant grows, the caregiver must repeat the belt installation procedure described above using other higher sets of belt-receiving apertures formed in a higher portion of the back wall of the car seat to enlarge the child car seat harness to accommodate the growing child. Many caregivers would welcome a car seat that is adaptable to hold infants, toddlers, and juveniles and, in particular, is adaptable to adjust the size of the child-restraint harness quickly and easily to accommodate children of various sizes in the child car seat.

In accordance with the present invention, a child-restraint seat includes a seat adapted to seat a child, a child-restraint harness, and a harness-control panel formed to include a belt-receiving opening receiving a shoulder belt portion of the child-restraint harness. The harness-control panel is mounted on the seat shell for up and down movement relative to the seat to raise and lower the shoulder belt portion of the child-restraint harness with respect to a bottom seat portion of the seat so as to harness both small-sized and large-sized children properly in a restrained position in the seat.

In preferred embodiments, the movable harness-control panel includes a back plate formed to include two horizontally extending spaced-apart slots and two support arms. A forward end of each support arm is coupled to the back plate and the rearward end of each support arm passes through one of two guide slots formed in a back support portion of the seat to guide up and down movement of the harness-control panel relative to the seat. A height-adjustment apparatus is coupled to the rearward ends of the support arms and operated to move the harness-control panel up and down relative to the seat to one of several predetermined heights above the bottom seat portion defined by position locator slots formed on a rearward side of the back support portion.

The back support portion is formed to include two slanted channels positioned to lie behind the back panel and between the guide slots. The two slanted channels are aligned in V-shaped relation to communicate with the two slots formed in the back plate during up and down movement of the back plate relative to the seat.

Movement of the harness-control panel simultaneously controls the height of two shoulder belts included in the child-restraint harness above the bottom seat portion and lateral spacing between the two shoulder belts. The two shoulder belts should be higher above the bottom seat portion and farther apart from one another to harness a larger-sized child in a seat properly. The same two shoulder belts should be closer to the bottom seat portion and closer to one another to harness a smaller-sized child properly in the same seat.

A middle portion of the first shoulder belt passes through a first slot in the back panel and a matching first slanted channel in the back support portion and connects to the height-adjustment apparatus. Likewise, a middle portion of the second shoulder belt passes through a second slot in the back panel and a matching second slanted channel in the back support portion and connects to the height-adjustment apparatus. By operating the height-adjustment apparatus it is possible at the option of a caregiver either to raise the back panel higher above the bottom seat portion, thereby raising the shoulder belts higher and spreading the shoulder belts farther apart so as to accommodate and harness a larger-sized child or to lower the back panel closer to the bottom seat portion, thereby moving the shoulder belts lower and bringing the shoulder belts closer together so as to accommodate and harness a smaller-sized child.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIGS. 7–9 show a sequence of steps in which the bar release (pull) handle is moved and the panel height-adjustment mechanism is operated to raise the harness-control panel from a lowest position (in which the horizontal belt support bar engages a first slot formed in the vertical bar anchor member) to a next highest position (in which the horizontal belt support bar engages a second slot formed in the vertical bar anchor member);

DETAILED DESCRIPTION OF THE DRAWINGS

Figures 1, 2:
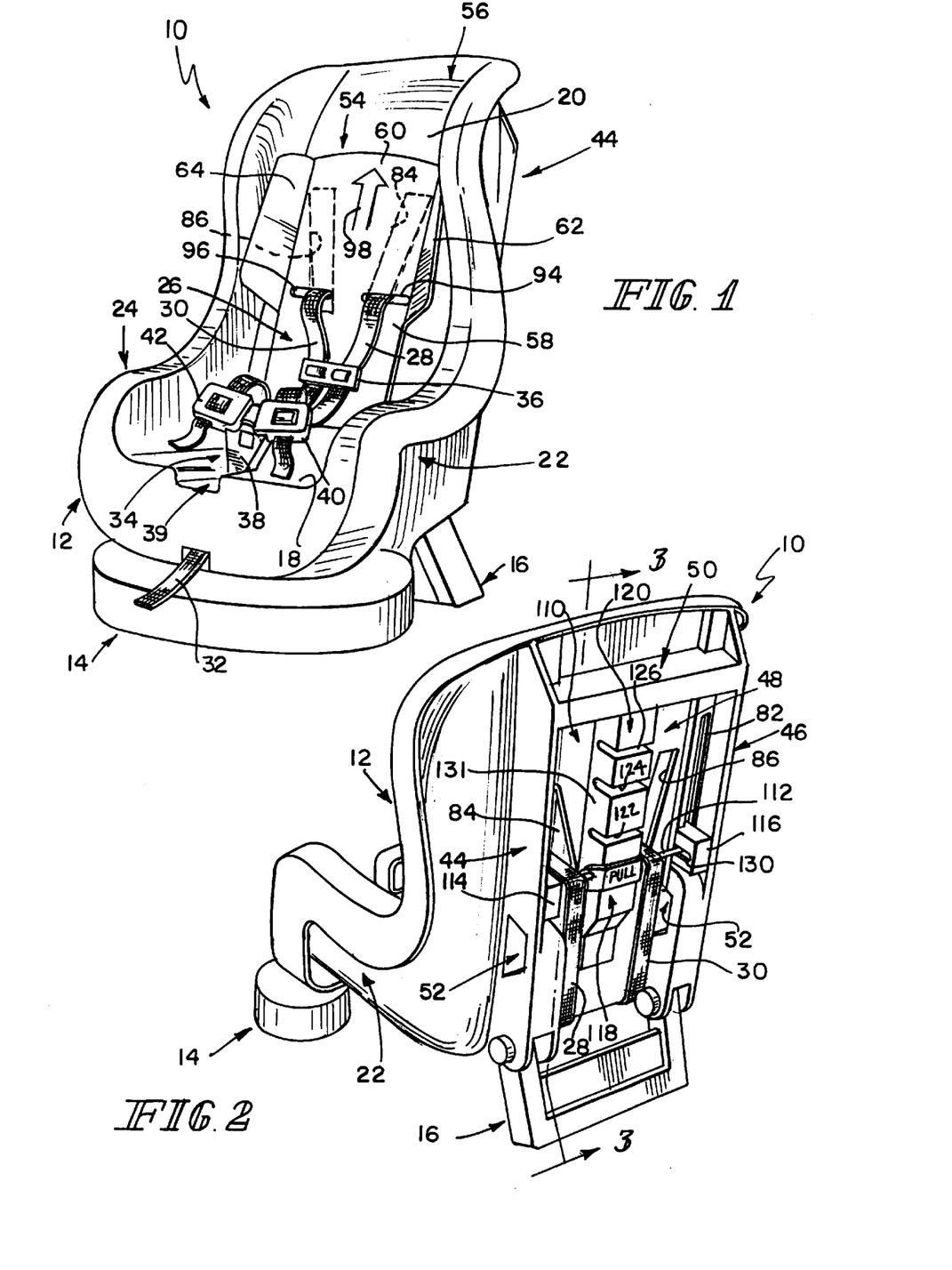
FIG. 1 is a front perspective view of a seat including a seat shell, a child-restraint harness coupled to the seat shell, and a harness-control panel movable up and down relative to the seat shell (in a position behind a child seated in the seat shell) to adjust the height of shoulder belts included in the child-restraint harness relative to a bottom seat portion in the seat shell to adapt the seat for use by both small-sized and large-sized children.
FIG. 2 is a rear perspective view of the seat of FIG. 1 showing two shoulder belts in the child-restraint harness extending along a back side of the seat shell and engaging a horizontal belt support bar included in a panel height-adjustment mechanism coupled to the harness-control panel and the seat shell through an opening formed in the seat shell and showing a slotted vertical support bar anchor member coupled to the back side of the seat shell and a bar release (pull) handle included in the panel height-adjustment mechanism.
Figure 3:
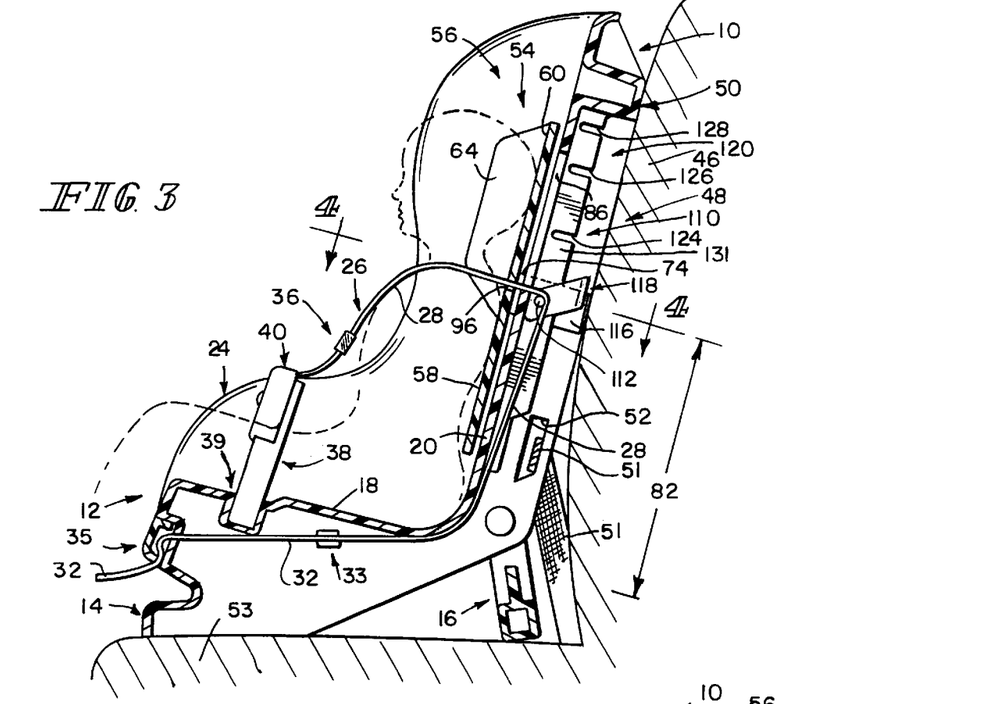
FIG. 3 is a vertical sectional view of the seat of FIGS. 1 and 2 taken along line 3—3 of FIG. 2 showing the child-restraint harness coupled to the seat shell and panel height-adjustment mechanism to restrain a child (shown in phantom) seated in the seat and showing the harness-control panel positioned to lie in a lowest one of four available positions (with the shoulder belts passing therethrough) and retained in such a position by the panel height-adjustment mechanism.

A seat 10 includes a seat shell 12, a base 14, and a pivotable leg 16 as shown in FIGS. 1–3. Seat shell 12 and base 14 are molded out of plastics material to form a child-supporting seat. Seat 10 can be converted for use as a forward-facing seat or a rearward-facing seat by movement of pivotable support leg 16 relative to base 14. Although seat shell 12 is a one-piece molded body in the illustrated embodiment, it is within the scope of the present invention to use a multiple-piece body.

Seat shell 12 includes a bottom seat portion 18 adapted to support a child's bottom and upper legs and a back support portion 20 positioned to lie at an angle to bottom seat portion 18. First and second side wall portions 22, 24 are provided for preventing lateral movement of the child in seat 10 and lie on opposite sides of bottom seat portion 18. A cushion or seat cover (not shown) can cover bottom and/or back support portions 18, 20 for added comfort.

A harness 26 including shoulder belts 28, 30, a lower belt 32, and a buckle unit 34 is provided for further restraining a child's movement relative to seat shell 12 as shown in FIGS. 1 and 3. A harness retainer 36 is used to hold shoulder belts 28, 30 together as shown in FIG. 1. One end of lower belt 32 is coupled to shoulder belts 28, 30 by a junction member 33 and another end of lower belt 32 is coupled to seat 10 by a belt adjustment mechanism 35 as shown in FIG. 3. Buckle unit 34 includes a frame 38 selectively coupled to a connector 39 on bottom seat portion 18, a buckle 40 coupling first shoulder belt 28 to frame 38, and a buckle 42 coupling second shoulder belt 30 to frame 38. Seat 10 can be adapted to receive other harnesses (not shown) and a combination of a harness and a movable barrier shield as shown, for example, in FIGS. 17–20.

As shown, for example, in FIG. 2, seat 10 includes first and second vertical back ribs 44, 46 appended to back support portion 20 and positioned to lie in spaced-apart relation to one another to define a space 48 therebetween. Seat 10 also includes a horizontal back rib 50 appended to back support portion 20 and positioned to interconnect upper ends of vertical back ribs and define an upper boundary of space 48. Each vertical back rib 44, 46 is formed to include a vehicle belt channel 52 for receiving a vehicle lap belt 51 when seat 10 is restrained on a vehicle seat 53 in a forward-facing position as shown, for example, in FIG. 3.

A harness-control panel 54 is positioned to lie in a child-receiving space 56 defined in a front portion of seat 10 and is mounted for up-and-down movement relative to bottom seat portion 18 in seat 10 as shown best in FIGS. 1, 4, 5, 7–10, 12, 14, and 15. Up-and-down movement of harness-control panel 54 functions to raise and lower the "height" of shoulder belts 28, 30 above bottom seat portion 18 and to adjust the "lateral spacing" of shoulder belts 28, 30 relative to one another to adapt seat 10 to accommodate young, small-sized children or older, larger-sized children.

Harness-control panel 54 includes a back plate 58 formed to include shoulder belt-receiving slots 94, 96, a headrest 60 provided in an upper portion of back plate 58 above slots 94, 96, and first and second wing members 62, 64 coupled to opposite edges of back plate 58 and positioned to lie in spaced-apart relation to one another. Each wing member 62, 64 is oriented to lie at an angle relative to back plate 58 as shown, for example, in FIGS. 1 and 4. Up-and-down movement of harness-control panel 54 also functions to raise and lower the height of headrest 60 above bottom seat portion 18 to adapt seat 10 to accommodate young, small-sized children or older, larger-sized children. As shown, for example, in FIGS. 5, 10, and 12, the shoulder belts 28, 30 and headrest 60 move up and down together relative to seat shell 12 and shoulder belts 28, 30 move together and apart during movement of harness-control panel 54 to assure proper shoulder belt fit for a child seated in seat 10.

Figure 4:
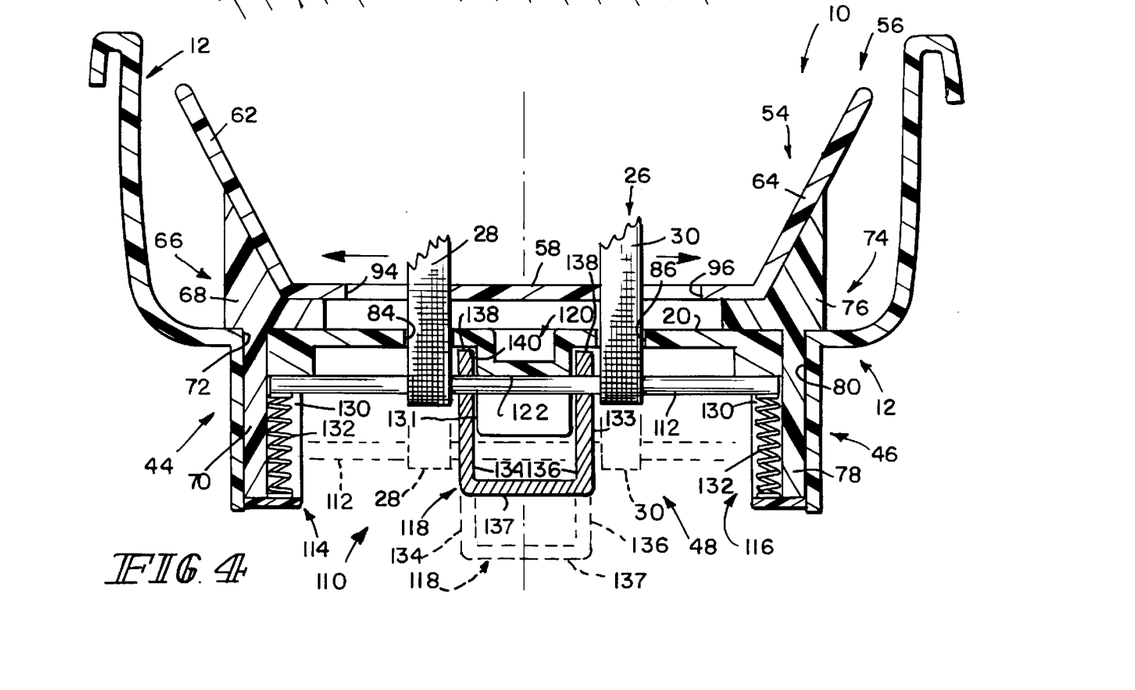
FIG. 4 is a transverse sectional view taken along line 4—4 of FIG. 3 showing a back support portion of the seat shell positioned to lie between the movable harness-control panel and the panel height-adjustment mechanism and showing the two shoulder belts extending through openings formed in the harness-control panel and back support portion to engage the spring-biased horizontal belt support bar included in the panel height-adjustment mechanism and to lie on opposite sides of the slotted vertical bar anchor member and a bar release handle.
Figure 5:
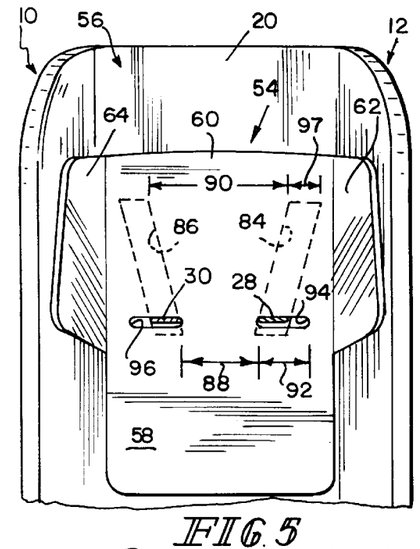
FIG. 5 is a front elevation view of an upper portion of the seat of FIGS. 1–4 showing the harness-control panel in a lowest position within the seat shell.
Figure 6:
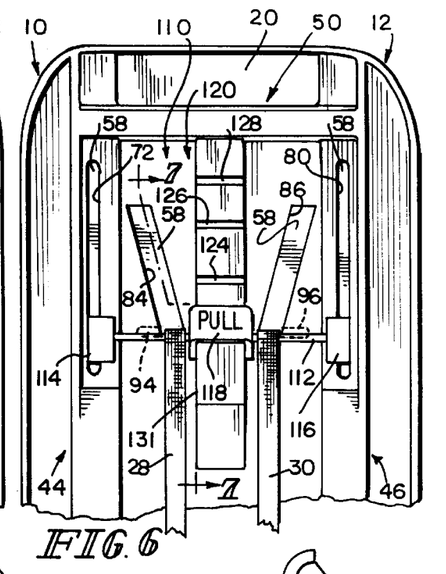
FIG. 6 is a rear elevation view of the upper portion of the seat shown in FIG. 5 showing the two shoulder belts, the horizontal belt support bar, the bar release (pull) member coupled to the horizontal belt support bar, and the slotted vertical support bar anchor positioned to engage a middle portion of the horizontal belt support bar.

As shown best in FIGS. 3, 4, and 6, harness-control panel 54 includes a first support arm 66 having a front end 68 coupled to back plate 58 and first wing member 62 and a rear end 70 passing through a first vertical guide slot 72 formed in seat shell 12 to extend into space 48 between first and second vertical back ribs 44, 46. Harness-control panel 54 also includes a second support arm 74 having a front end 76 coupled to back plate and second wing member 64 and a rear end 78 passing through a second vertical guide slot 80 formed in seat shell 12 to extend into space 48. Guide slots 72, 80 are formed in back support portion 20 of seat shell 12 to lie in spaced-apart parallel relation to one another. First guide slot 72 is also formed in first vertical back rib 44 and second guide slot 80 is also formed in second vertical back rib 46 as shown best in FIGS. 4 and 6. First support arm 66 reciprocates in first guide slot 72 and second support arm 66 reciprocates in second guide slot 80 as harness-control panel 54 moves up and down relative to back support portion 20 between a lowest position (shown, for example, in FIGS. 1, 3, and 5) adapted to suit a young, small-sized child and a highest position (shown, for example, in FIGS. 14–16) adapted to suit an older, larger-sized child.

Back support portion 20 of seat shell 12 and back plate 58 of movable harness-control panel 54 are configured to cooperate to set the nominal height 82 (See FIG. 3) of first and second shoulder belts 28, 30 above bottom seat portion 18 of seat shell 12 and to set the nominal lateral spacing between the first and second shoulder belts 28, 30 so as to adapt seat 10 to accommodate either a young, smaller-sized child or an older, larger-sized child at the option of a child caregiver using seat 10. A caregiver can raise and lower harness-control panel 54 easily to change the height and lateral spacing of first and second shoulder belts 28, 30.

Back support portion 20 is formed to include two vertical slanted channels 84, 86 shown, for example, in FIGS. 1 and 3 (phantom) and in FIGS. 2 and 4 (solid). The slanted channels 84, 86 are aligned in spaced-apart diverging relation (lowest end to highest end) to lie "behind" back plate 58 of harness-control panel 54 so that first shoulder belt 28 can pass through first slanted channel 84 and second shoulder belt 30 can pass through second slanted channel 86. As shown in FIG. 5, a first distance 88 separates the lowest end of slanted channels 84, 86 and a longer, second distance 90 separates the highest end of slanted channels 84, 86. The slanted channels 84, 86 are arranged to lie in a somewhat V-shaped pattern.

Harness-control panel 54 is formed to include a pair of spaced-apart horizontally extending, elongated, belt-receiving slots 94, 96 as shown, for example, in FIGS. 1 and 5. Each slot 94, 96 has a length 92 that is greater than the nominal width 97 (FIG. 5) of a companion one of the slanted channels 84, 86.

First slot 94 is sized to receive a portion of first shoulder belt 28 and allow the portion of first shoulder belt 28 also to pass through first slanted channel 84. First slanted channel 84 formed in back support portion 20 is arranged to lie in communication with belt-receiving slot 94 formed in harness-control panel 54 to enable movement of a portion of first shoulder belt 28 in slot 94 and slanted channel 84 during up and down movement of harness-control plate 54 relative to seat shell 12.

Second slot 96 is sized to receive a portion of second shoulder belt 30 and allow the portion of second shoulder belt 30 also to pass through second slanted channel 86. Second slanted channel 86 formed in back support portion 20 is arranged to lie in communication with belt-receiving slot 96 formed in harness-control panel 54 to enable movement of a portion of second shoulder belt 30 in slot 96 and slanted channel 96 during up and down movement of harness-control plate 54 relative to seat shell 12.

The height of harness-control panel 54 above bottom seat portion 18 determines the nominal height 82 (i.e. seat shell entry point) of the first and second shoulder belts 28. Seat 10 can be adjusted to accommodate young, small-sized children by moving harness-control panel 54 to its lowest position shown, for example, in FIGS. 1, 3, and 5 to minimize nominal height 82 and cause the seat shell entry points of shoulder belts 28, 30 to be lowered. In this position, it is contemplated that harness 26 will be used to restrain a young, small-sized child seated in seat 10 as shown in FIG. 3. Seat 10 can also be adjusted to assume other positions shown in FIGS. 10 and 12 to accommodate somewhat older, larger children in seat 10 by raising harness-control panel 54 upwardly in direction 98 relative to back support portion 20 of seat shell 12 to increase nominal height 82 and cause the seat shell entry point of shoulder belts 28, 30 to be raised.

Figure 10:
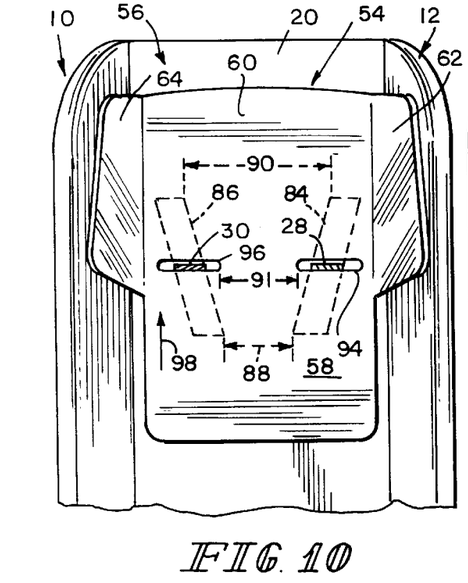
FIG. 10 is a front elevation view similar to FIG. 5 showing the harness-control plate in its second position (corresponding to the position shown in FIG. 9)
Figure 12:
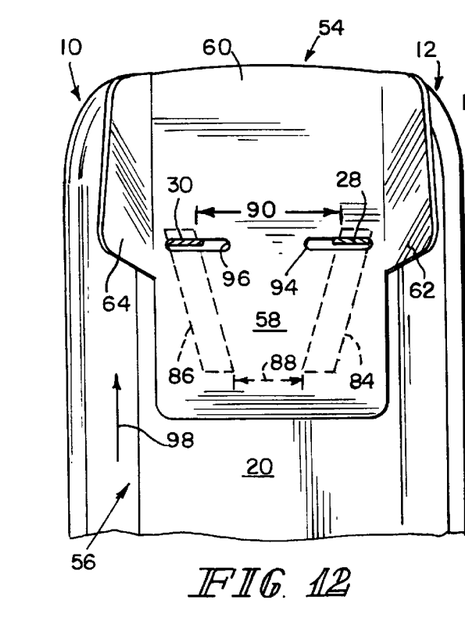
FIG. 12 is a front elevation view similar to FIGS. 5 and 10 showing the harness-control plate in a third position raised above the second position shown in FIG. 10.

The slanted channels 84, 86 formed in fixed back support portion 20 are sized, angled, and otherwise arranged so that they cooperate with belt-receiving slots 94, 96 formed in movable harness-control panel 54 to move the shoulder belts 28, 30 close to one another as shown in FIG. 5 (separated only by short lateral distance 88) when the harness-control panel 54 occupies a "low position" suitable for young, small-sized children and to move the shoulder belts 28, 30 farther apart from one another as shown in FIG. 12 (separated by a longer lateral distance 90) when the harness-control panel 54 occupies a "high position" suitable for older, larger children. As shown in FIG. 10, slanted channels 84, 86 and belt-receiving slots 94, 96 cooperate to move shoulder belts 28, 30 to a position separated by a lateral distance 91 that is less than long lateral distance 90 but greater than short lateral distance 88 when the harness-control panel 54 occupies a "middle position" suitable for middle-sized children. As shown in FIGS. 5, 10, and 12, the slant angles (with respect to the vertical) of slanted channels 84, 86 and the lateral length of belt-receiving slots 94, 96 cooperate to define a pair of shoulder belt-receiving apertures that effectively move closer together or farther apart in response to lowering and raising of harness-control panel 54 relative to back support portion 20.

Figure 14:
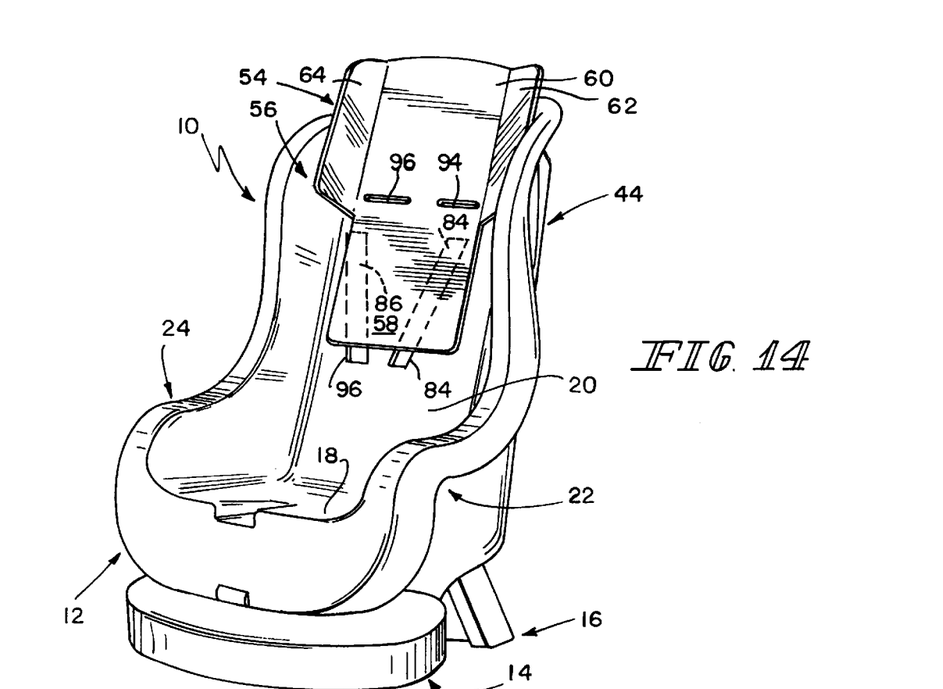
FIG. 14 is a front perspective view of the seat of FIG. 1 showing the harness-control plate fixed in a fourth position relative to the seat shell to position a headrest appended to the harness-control plate at a highest elevation above the bottom seat portion of the seat and showing that no child-restraint harness is coupled to the seat because, in this position, the seat is adapted to be used with an existing adult seat belt restraint system provided in a vehicle in which the seat is used to support a child.
Figure 15:
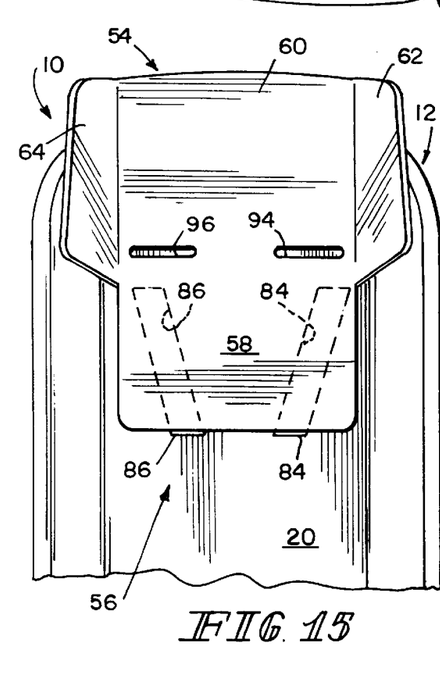
FIG. 15 is a front elevation view similar to FIGS. 5, 10, and 12 of the seat of FIG. 14 showing the harness-control plate in the fourth position and showing that the two belt-receiving apertures formed in the harness-control plate are spaced apart from the two slanted belt-receiving apertures (shown in phantom) formed in the seat shell.
Figure 16:
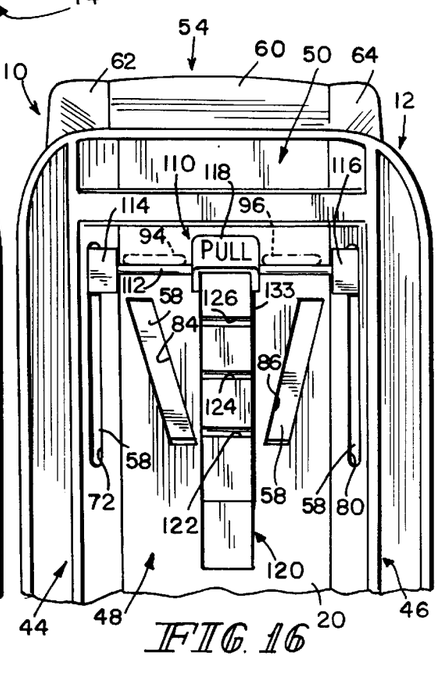
FIG. 16 is a rear elevation view similar to FIGS. 6, 11, and 13 showing the upper portion of the seat shown in FIGS. 14 and 15 wherein the horizontal belt support bar engages a fourth slot formed in the vertical bar anchor member.
Figures 17, 18:
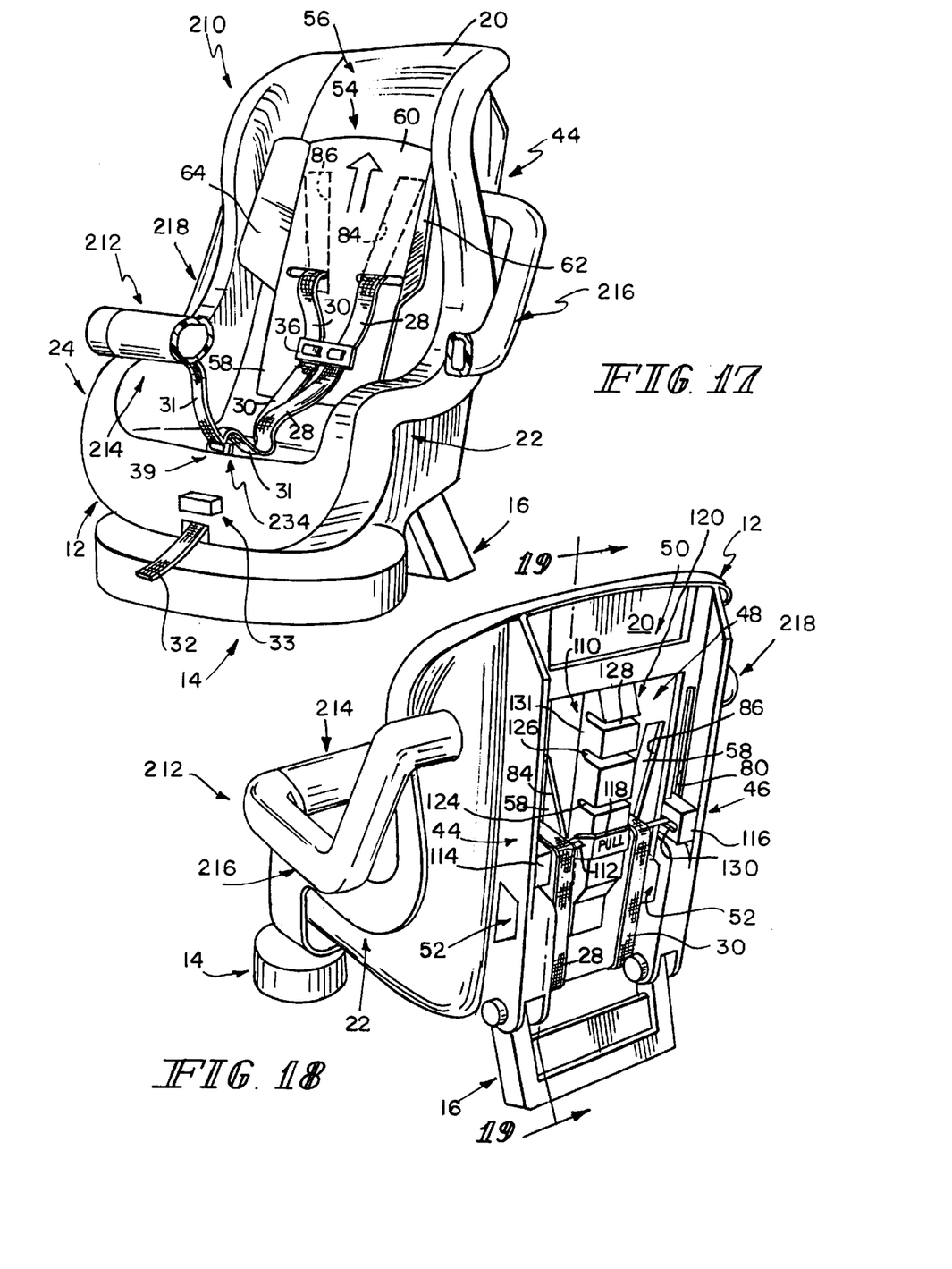
FIGS. 17–20 are views of a second embodiment of a seat including a three-point harness coupled to a pivotable restraint shield, which views are similar to FIGS. 1–4, respectively.
Figure 19:
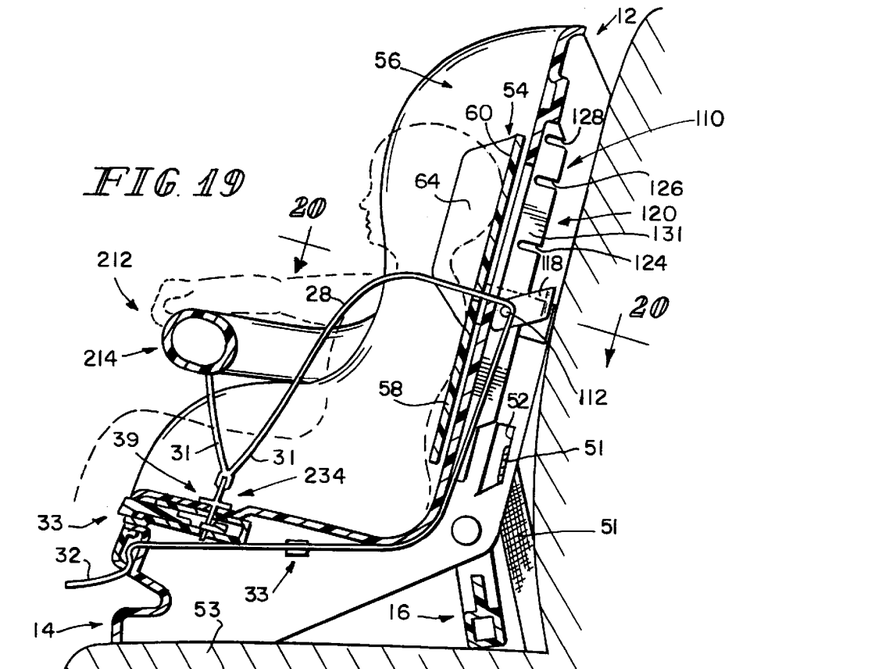
Figure 20:
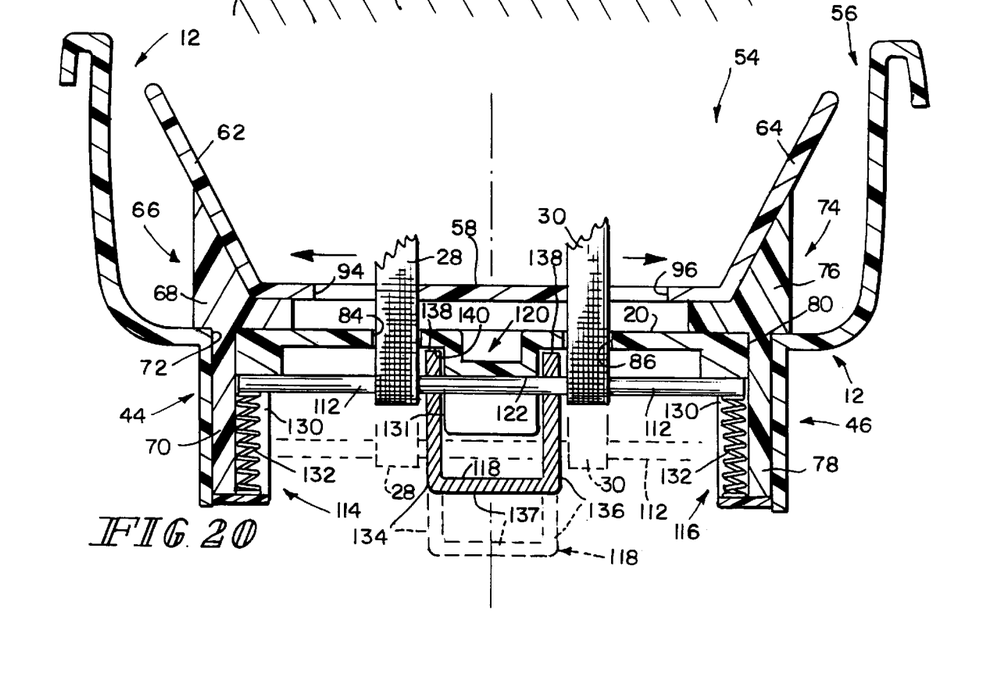

Seat 10 can also be adjusted to accommodate even older, larger-sized children by moving harness-control panel 54 to its highest position shown, for example, in FIGS. 14–16. In this position, it is contemplated that harness 26 will be removed from seat 10 (or tucked in an out-of-the-way, unused position) and that an adult three-point vehicle lap/ shoulder belt (not shown) will be used to restrain a child seated in seat 10. In its highest position, harness-control panel 54 is used primarily to support headrest 60 in a proper elevated position relative to bottom seat portion 18. Harness-control panel 54 is not used to control the seat shell entry points of shoulder belts 28, 30 since those belts are not used to restrain a child in seat 10 in such a configuration. As such belt-receiving slot 94 does not communicate with first slanted channel 84 and belt-receiving slot 96 does not communicate with second slanted channel 86 when harness-control panel 54 and its headrest 60 is positioned in its highest position as shown, for example, in FIGS. 14–16.

A panel height-adjustment mechanism 110 is included in seat 10 and operable to control the height of harness-control panel 54 relative to bottom seat portion 18. Panel height-adjustment mechanism 110 includes a belt support bar 112, a first bar-mounting block 114 coupled to rear end 70 of first harness-control plate support arm 66 for movement therewith, a second bar-mounting block 116 coupled to rear end 78 of second harness-control plate support arm 74 for movement therewith, and a bar release member 118 coupled to belt support bar 112.

Figure 9:
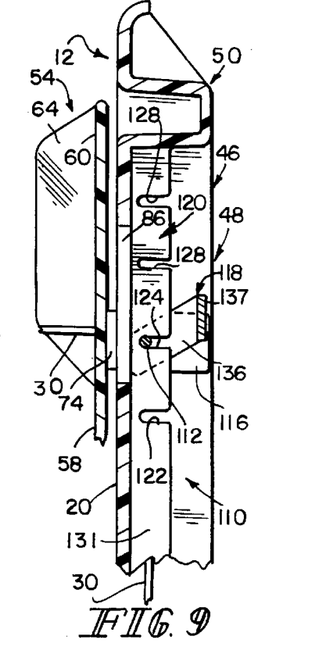
FIG. 9 is a sectional view similar to FIGS. 7 and 8 showing engagement of the horizontal belt support bar in a second slot to establish a fixed raised position of the harness-control panel relative to the seat shell above the lowest position shown in FIGS. 1–7 and showing that the shoulder belts pass though the seat shell when the harness-control panel occupies its second position at a point that is higher than the seat shell entry point of the shoulder belts when the harness-control panel occupies its lowest position shown, for example, in FIG. 5–6.
Figure 11:
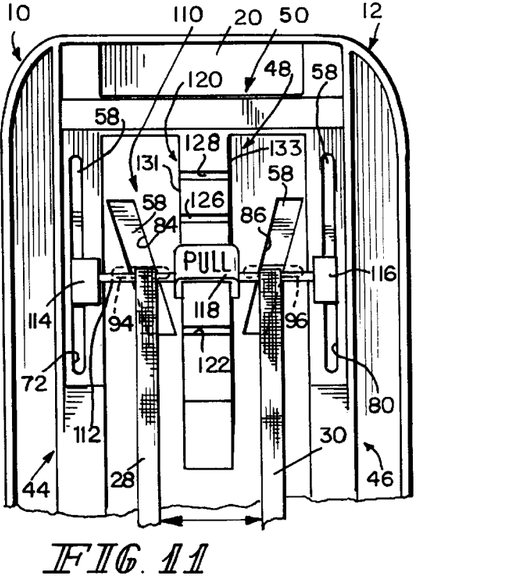
FIG. 11 is a rear elevation view similar to FIG. 6 showing the upper portion of the seat shown FIG. 10 wherein the horizontal belt support bar engages the second slot formed the vertical bar anchor member.
Figure 13:
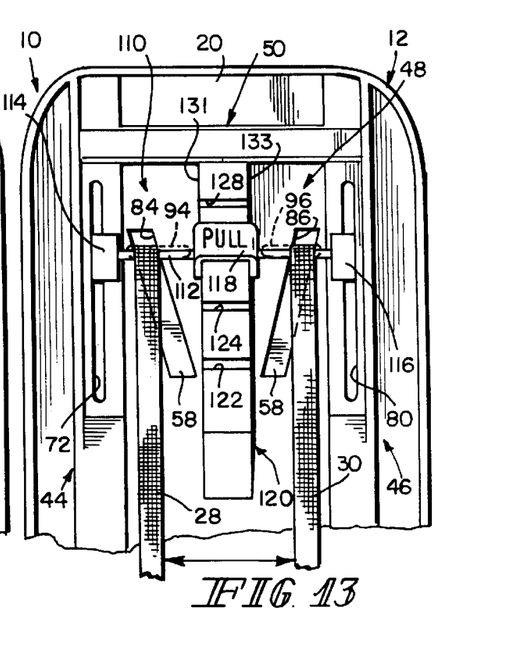
FIG. 13 is a rear elevation view similar to FIGS. 6 and 11 showing the upper portion of the seat shown in FIG. 12 wherein the horizontal belt support bar engages a third slot formed in the vertical bar anchor member.

A vertical bar anchor member 120 is coupled to a rear side of back support portion 20 to lie in space 48 midway between first and second vertical back ribs 44, 46. In a presently preferred embodiment, an upper end of vertical bar anchor member 120 is coupled to a mid-portion of horizontal back rib 50. Vertical bar anchor member 120 is formed to include a plurality of panel height locators such as vertically spaced-apart slots (e.g. slots 122, 124, 126, and 128), each slot for receiving belt support bar 112 therein to establish a fixed position of first and second support arms 66, 74 (and harness-control panel 54 coupled to those support arms 66, 74) relative to the underlying bottom seat portion 18 of seat shell 12. Slot 122 is located to define a "lowest" position of harness-control panel 54 as shown in FIGS. 1–7. Slot 124 is located to define a "middle" position of harness-control panel 54 as shown in FIGS. 9–11. Slot 126 is located to define a "high" position of harness-control panel 54 as shown in FIGS. 12 and 13. Slot 128 is located to define a "highest" position of harness-control panel 54 as shown in FIGS. 14–16 wherein an older, larger sized child is restrained in seat 10 using an adult vehicle shoulder and lap belt assembly rather than using child-restraint harness 26 provided in seat 10.

Each of the first and second bar-mounting blocks 114, 116 is formed to include a somewhat horizontal guide channel 130 for receiving one end (or a portion) of belt support bar 112 therein and supporting belt support bar 112 for back-and-forth sliding movement as belt support bar 112 is moved into and out of any of the slots 122, 124, 126, and 128 formed in vertical bar anchor member 120 during movement of harness-control panel 54 relative to seat shell 12. A spring 132 is positioned in each of the first and second bar-mounting blocks 114, 116 and arranged to urge belt support bar 112 in a direction toward back support portion 20 so as to cause belt support bar 112 to be retained in one of the slots 122, 124, 126, 128 formed in vertical bar anchor member 120 upon movement of belt support member 112 into such a slot. As shown in the drawings, shoulder belts 28, 30 are positioned to wrap around belt support member 112 and lie on opposite sides of vertical bar anchor member 120 and bar release member 118 so that any raising or lowering of belt support member 112 relative to vertical bar anchor member 120 (and its slots 122, 124, 126, and 128) will change the nominal height 82 (and seat shell entry point) of the first and second shoulder belts 28, 30.

Figures 7, 8:
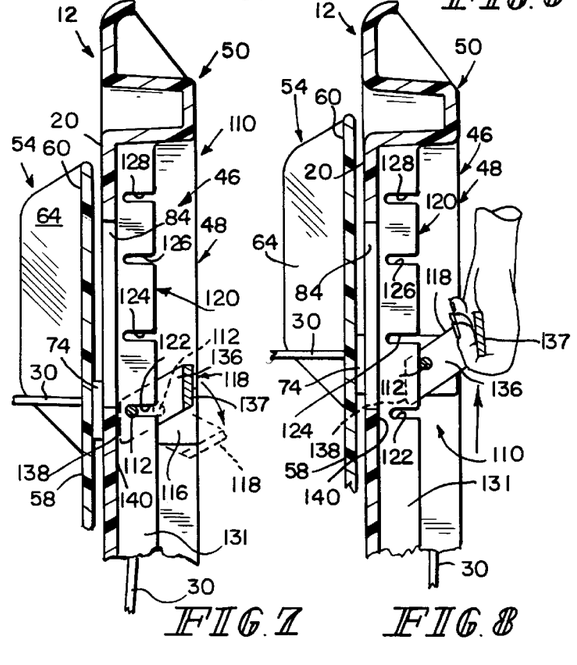
FIG. 7 is a sectional view taken along line 7—7 of FIG. 6 showing the horizontal belt support bar retained in the first slot formed in the vertical bar anchor member by the bar release handle (in solid) and showing (in phantom) movement of the bar release handle nearly to disengage the horizontal belt support bar from the first slot.
FIG. 8 is a sectional view similar to FIG. 7 showing upward movement of the harness-control panel relative to the seat shell due to raising of the horizontal belt support bar by a user lifting up on the bar release handle.

Bar release member 118 includes a first arm 134 coupled to belt support member 112 and positioned to lie on one side of vertical bar anchor member 120 and a second arm 136 coupled to belt support member 112 and positioned to lie on an opposite side of vertical bar anchor member 120 in spaced-apart relation to first arm 134. Bar release member 118 also includes a grip handle 137 interconnecting outer ends of first and second arms 134, 136. First and second arms 134, 136 include cam faces 138 for acting against a rear wall 140 of back support portion 20 as shown, for example, in FIG. 7 to move belt support member 112 from an engaged position in slot 122 formed in bar anchor member 120 to a position disengaging slot 122. Then, as shown in FIGS. 8 and 9, a user can move bar release member 118 relative to bar anchor member 120 to engage one of the other slots 124, 126, or 128 formed in bar anchor member 120 to change the nominal height 82 (seat shell entry point) of the two shoulder belts 28, 30 so as to adapt seat 10 to be used by children of various sizes.

Bar release member 118 is an adjusting handle that has a cam rotation system to make the spring-loaded belt support member 112 easier to adjust. The steel bar support member 112 acts as a cam pivot when bar release member 118 is rotated to urge cam faces 138 into camming engagement with rear wall 140. Such camming action moves bar support member 112 to an outward position disengaging the slots in bar anchor member 120 so that bar support member 112 and the shoulder belts 28, 30 supported thereon can be moved up or down. Side walls 131, 133 of bar anchor member 120 engage first and second arms 134, 136 of bar release member 118 to keep bar release member 118 in proper lateral alignment as it is moved up and down on vertical bar anchor member 120.

A seat 210 is shown in FIGS. 17–20. Seat 210 is similar in most respects to seat 10. However, seat 210 includes a pivotable swing arm unit 212 for restraining forward movement of a child in seat 210. Swing arm unit 212 includes a barrier shield 214, a left swing arm 216 coupled to one end of barrier shield 214, and a right swing arm 218 coupled to another end of barrier shield 214. Left swing arm 216 is pivotably coupled to one side of seat shell 12 and right swing arm 218 is pivotably coupled to another side of seat shell 12. Shoulder belts 28, 30 are coupled at one end to a strap 31 that is coupled to a buckle unit 234 that can be selectively coupled to connector 39 on bottom seat portion. Strap 31 is also coupled to barrier shield 214.

Although this invention has been described in detail with reference to certain embodiments, variations and modifications exist within the scope and spirit of the invention as described and defined in the following claims.

I claim:

1. A child-restraint seat comprising
   a seat shell including a bottom seat portion and a back support portion, the seat shell being adapted to be coupled to a vehicle seat by a seat anchor coupled to the vehicle,
   a child-restraint harness coupled to the seat shell, and
   a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell, the harness-control panel being positioned to lie adjacent to a front surface of the back support portion to cause a child seated in the seat shell to rest against the harness-control panel.

2. The child-restraint seat of claim 1, wherein the harness-control panel includes a back plate formed to include first and second spaced-apart slots defining the belt-receiving opening, the shoulder belt portion of the child-restraint harness includes first and second shoulder belts, the back support portion is positioned to lie at an angle to the bottom seat portion and formed to include first and second slanted channels aligned in spaced-apart diverging relation to lie behind the back plate so that the first shoulder belt passes through the first slot and first slanted channel and the second shoulder belt passes through the second slot and second slanted channel during up and down movement of the harness-control panel relative to the seat shell.

3. The child-restraint seat of claim 2, wherein the first slanted channel has a nominal width and the first slot has a length that is greater than the nominal width of the first slanted channel.

4. The child-restraint seat of claim 2, wherein the back support portion is formed to include two guide slots arranged in spaced-apart relation to position the first and second slanted channels therebetween, the harness-control panel further includes two support arms coupled to the back plate, and each of the support arms is arranged to extend through one of the guide slots.

5. The child-restraint seat of claim 4, wherein the back support portion includes a front surface facing toward the harness-control panel and a rear surface facing away from the harness-control panel, each guide slot defines an aperture extending through the back support portion and having an opening in each of the front and rear surfaces of the back support portion, and each support arm passes through one of the openings in the front surface of the back support portion and one of the openings in the rear surface of the back support portion.

6. The child-restraint seat of claim 4, further comprising means coupled to the support arms and to the back support portion for moving the back plate and the first and second shoulder belts received in the first and second slots formed in the back plate up and down relative to the seat shell.

7. The child-restraint seat of claim 5, wherein the moving means includes a pair of springs each coupled to a belt support member and one of the support arms, the belt support member is provided for generally horizontal movement between a first position and a second position relative to the back support portion such that the second position is a greater distance spaced-apart from the harness-control panel than the first position so that when the belt support member is in the second position, the harness-control panel is movable up and down relative to the seat shell.

8. The child-restraint seat of claim 2, wherein the harness-control panel further includes a headrest provided in an upper portion of the back plate above the first and second spaced-apart slots and adapted to extend above an upper edge of the back support portion upon removal of the first and second shoulder belts from the first and second spaced-apart slots and the first and second slanted channels and movement of the harness-control panel to a highest position relative to the seat shell.

9. The child-restraint seat of claim 8, wherein the first and second spaced-apart slots are located in a position below the headrest to lie in spaced-apart relation to the first and second slanted channels upon movement to the harness-control panel to the highest position relative to the seat shell.

10. The child-restraint seat of claim 1, wherein the back support portion of the seat shell is positioned to lie at an angle to the bottom seat portion and formed to include a guide slot extending therethrough and the harness-control panel includes a back plate formed to include the belt-receiving opening and arranged to lie adjacent to a front surface of the seat shell to cause a child seated in the seat shell to rest against the back plate and a support arm coupled to the back plate and arranged to extend through the guide slot formed in the back support portion and reciprocate up and down therein as the back plate moves up and down relative to the back support portion between a low position adapted to suit a small-sized child and a higher position adapted to suit a larger-sized child.

11. The child-restraint seat of claim 10, wherein the back support portion is also formed to include a slanted channel oriented to lie at an angle to the guide slot and arranged to receive the portion of the child-restraint harness therein and lie in communication with the belt-receiving opening formed in the back plate to enable movement of the portion of the child-restraint harness in the belt-receiving opening formed in the back plate and the slanted channel formed in the back support portion during up and down movement of the back plate relative to the seat shell.

12. The child-restraint seat of claim 11, wherein the slanted channel in the back support portion has a nominal width and the belt-receiving opening in the back plate is a slot having a length that is greater than the nominal width of the slotted channel.

13. The child-restraint seat of claim 10, wherein the back support portion is formed to include two spaced-apart guide slots extending therethrough and the harness-control panel includes two support arms coupled to the back plate and each support arm is arranged to extend through one of the guide slots.

14. The child-restraint seat of claim 10, wherein the harness-control panel includes first and second wing members coupled to opposite edges of the back plate and positioned to lie in spaced-apart relation to one another and the support arm is also coupled to one of the first and second wing members.

15. The child-restraint seat of claim 10, wherein the seat shell further includes a vertical back rib appended to a back surface of the back support portion and wherein the vertical back rib is formed to include the guide slot.

16. The child-restraint apparatus of claim 1, wherein the back support portion is positioned to lie at an angle to the bottom seat portion and the seat shell further includes means coupled to the back support portion for moving the harness-control panel up and down relative to the bottom seat portion.

17. The child-restraint apparatus of claim 16, wherein the moving means includes panel height locators coupled to the back support portion at different elevations above the bottom seat portion and means coupled to the harness-control panel for engaging a selected one of the panel height locators to establish a selected elevation of the harness-control panel and the shoulder belt portions of the child-restraint harness received in the belt-receiving opening formed in the harness-control panel above the bottom seat portion.

18. The child-restraint apparatus of claim 17, wherein the back support portion includes a front side facing toward a child seated in the seat shell and an opposite rear side, an anchor member is appended to the rear side and formed to include a plurality of vertically spaced-apart slots, and each slot defines one of the panel height locators and is configured to receive a portion of the engaging means therein.

19. A child-restraint seat comprising a seat shell including a bottom seat portion, a child-restraint harness coupled to the seat shell, and a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell, the seat shell further including a back support portion positioned to lie at an angle to the bottom seat portion and further comprising means coupled to the back support portion for moving the harness-control panel up and down relative to the bottom seat portion, moving means including panel height locators coupled to the back support portion at different elevations above the bottom seat portion and means coupled to the harness-control panel for engaging a selected one of the panel height locators to establish a selected elevation of the harness-control panel and the shoulder belt portions of the child-restraint harness received in the belt-receiving opening formed in the harness-control panel above the bottom seat portion, wherein the back support portion is formed to include an opening therein and the harness-control panel includes a back plate formed to include the belt-receiving opening and at least one support arm coupled to the back plate and to the engaging means and arranged to extend through the opening formed in the back support portion.

20. A child-restraint seat comprising a seat shell including a bottom seat portion, a child-restraint harness coupled to the seat shell, and a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell, wherein the seat shell includes a back support portion positioned to lie at an angle to the bottom seat portion and formed to include at least two position locator slots and the seat shell further comprising a belt support member engaging the child-restraint harness and a bar release member mounted for movement on the belt support member and formed to include a cam face arranged to act against the back support portion to disengage the belt support member from one of the at least two position locator slots in response to movement of the bar release member relative to the belt-support member.

21. The child-restraint seat of claim 20, wherein the bar release member includes first and second arms coupled to the belt support member and a grip handle interconnecting outer ends of the first and second arms.

22. The child-restraint seat of claim 21, wherein each of the first and second arms also includes an inner end positioned to lie adjacent to the back support portion and the cam face includes a cam surface formed on the inner end of each of the first and second arms.

23. The child-restraint seat of claim 21, wherein the seat shell further includes a bar anchor member coupled to the back support portion and formed to include the position locator slots and the first and second arms are positioned to lie in spaced-apart relation to locate the bar anchor member therebetween.

24. The child-restraint apparatus of claim 21, further comprising a spring urging the belt support member into one of the at least two position locator slots and compressing during movement of the bar release member on the belt support member to disengage the belt support member from one of the at least two position locator slots.

25. The child-restraint seat of claim 21, further comprising a spring urging the belt support member into one of the at least two position locator slots, the spring formed to move the belt support member in a generally horizontal direction relative to the harness-control panel and between a first position engaged with one of the at least two position locator slots and a second position disengaged from the at least position locator slots.

26. A child-restraint seat comprising a seat back formed to include first and second slanted channels aligned in spaced-apart diverging relation, a harness-control plate including a back plate formed to include a first slot communicating with the first slanted channel and a second slot communicating with the second slanted channel, a child-restraint harness including a first shoulder belt passing through the first slot and slanted channel and a second shoulder belt passing through the second slot and slanted channel, and means for moving the harness-control plate up and down relative to the seat back to move the first and second shoulder belts passing through the first and second slots in the first and second slanted channels up and down relative to the seat back to accommodate small-sized and large-sized children, the seat back being positioned to lie between the harness-control plate and the moving means.

27. The child-restraint seat of claim 26, wherein the moving means includes a belt support bar arranged to lie behind the seat back to position the seat back between the harness-control plate and the belt support bar and the first and second shoulder belts exit the first and second slanted channels to engage the belt support bar.

28. The child-restraint seat of claim 27, wherein seat back is formed to include a guide slot, the harness-control panel further includes a support arm coupled to the back plate and to a spring coupled to the belt support bar to move therewith and arranged to pass through the guide slot formed in the seat back.

29. The child-resistant seat of claim 26, wherein the harness-control plate further includes a headrest provided in an upper portion of the back plate above the first and second spaced-apart slots and adapted to extend above an upper edge of the seat back upon removal of the first and second shoulder belts from the first and second spaced-apart slots and the first and second slanted channels and movement of the harness-control panel to a highest position relative to the seat shell.

30. The child-resistant seat of claim 29, wherein the first and second spaced-apart slots are located in a position below the headrest to lie in spaced-apart relation to the first and second slanted channels upon movement of the harness-control panel to the highest position relative to the seat shell.

31. A child-restraint seat comprising a seat back formed to include first and second slanted channels aligned in spaced-apart diverging relation, a harness-control plate including a back plate formed to include a first slot communicating with the first slanted channel and a second slot communicating with the second slanted channel, a child-restraint harness including a first shoulder belt passing through the first slot and slanted channel and a second shoulder belt passing through the second slot and slanted channel, means for moving the harness-control plate up and down relative to the seat back to move the first and second shoulder belts passing through the first and second slots in the first and second slanted channels up and down relative to the seat back to accommodate small-sized and large-sized children, the moving means including a belt support bar arranged to lie behind the seat back with the seat back located between the harness-control plate and the belt support bar and wherein the first and second shoulder belts exit the first and second slanted channels to engage the belt support bar, wherein the seat back is formed to include a guide slot, the harness-control panel further including a support arm coupled to the back plate and to a spring coupled to the belt support bar to move therewith and arranged to pass through the guide slot formed in the seat back, wherein the seat back further includes at least two position locator slots oriented to receive the belt support bar therein and the moving means includes at least one spring arranged to urge the belt support bar into one of the position locator slots upon movement of the belt support bar to lie in confronting relation therewith, and bar release means for selectively moving the belt support bar against the at least one spring to disengage the one of the position locator slots to enable a user to move the belt support bar up and down relative to the seat back, thereby moving the harness-control panel and the first and second shoulder belts up and down relative to the seat back.

32. A child-restraint seat comprising a seat back formed to include first and second slanted channels aligned in spaced-apart diverging relation and formed to include a guide slot, a harness-control plate including a back plate formed to include a first slot communicating with the first slanted channel and a second slot communicating with the second slanted channel, the harness-control plate including a support arm appended to the back plate and extending therefrom through the guide slot, a child-restraint harness including a first shoulder belt passing through the first slot and slanted channel and a second shoulder belt passing through the second slot and slanted channel, an anchor member coupled to the seat back and formed to include at least two panel height locators, and a panel-adjustment assembly coupled to the support arm and including a locking member that is movable relative to the support arm between a first position engaging one of the at least two panel height locators to prevent the harness-control plate from moving relative to the seat back and a second position disengaged from the at least two panel height locators to allow the harness-control plate to move up and down relative to the seat back to move the first and second shoulder belts passing through the first and second slots and passing through the slanted channels up and down relative to the seat back to accommodate small-sized and large-sized children.

33. The child-restraint seat of claim 32, wherein the guide slot is a first guide slot, the seat back includes a second guide slot, and the first and second slanted channels are positioned to lie between the first and second guide slots.

34. The child-restraint seat of claim 33, wherein the anchor member is positioned to lie between the first and second slanted channels.

35. The child-restraint seat of claim 33, wherein the harness-control plate includes a second support arm appended to the back plate and extending therefrom through the second guide slot and the locking member extends between the first and second support arms.

36. The child-restraint seat of claim 35, wherein the locking member is biased with respect to the first and second support arms toward the anchor member.

37. The child-restraint seat of claim 35, wherein the panel adjustment assembly includes a grip handle coupled to the locking member and movable to move the locking member between the first and second positions.

38. The child-restraint seat of claim 32, wherein the anchor member is a vertical rib, the locking member is a bar, and the vertical rib is formed to include a pair of bar-receiving slots that define the at least two panel height locators.

39. The child-restraint seat of claim 38, wherein the first and second shoulder belts each include respective portions that engage the bar.

40. The child-restraint seat of claim 38, wherein the bar is biased with respect to the support arm toward the vertical rib.

41. The child-restraint seat of claim 38, wherein the panel adjustment assembly includes a handle coupled to the bar for pivoting movement, the handle includes a cam face positioned in camming engagement with the seat back, and the cam face is shaped so that pivoting movement of the handle relative to the bar causes the bar to move between the first and second positions.

* * * * *

(12) EX PARTE REEXAMINATION CERTIFICATE (10017th)
United States Patent
Kain (10) Number: US 6,030,047 C1
(45) Certificate Issued: Jan. 23, 2014

(54) CHILD VEHICLE SEAT WITH CHILD-RESTRAINT HARNESS ADJUSTMENT MECHANISM

(75) Inventor: James M. Kain, Tipp City, OH (US)

(73) Assignee: Cosco, Inc., Columbus, IN (US)

Reexamination Request:
No. 90/009,903, Apr. 22, 2011

Reexamination Certificate for:
Patent No.: 6,030,047
Issued: Feb. 29, 2000
Appl. No.: 09/055,553
Filed: Apr. 6, 1998

Related U.S. Application Data

(60) Provisional application No. 60/041,914, filed on Apr. 7, 1997.

(51) Int. Cl.
*B60N 2/28* (2006.01)

(52) U.S. Cl.
USPC .......................................... 297/484; 297/250.1

(58) Field of Classification Search
None
See application file for complete search history.

(56) References Cited

To view the complete listing of prior art documents cited during the proceeding for Reexamination Control Number 90/009,903, please refer to the USPTO's public Patent Application Information Retrieval (PAIR) system under the Display References tab.

*Primary Examiner* — Catherine S. Williams (57) ABSTRACT

A child-restraint seat for a vehicle comprising a seat shell including a bottom seat portion, a back support portion and a child-restraint harness wherein a harness-control panel positioned to lie adjacent to a front surface of the back support portion to cause a child seated in the seat shell to rest against the harness-control panel and formed to receive a shoulder belt portion of the child-restraint harness is mounted on the seat shell for up and down movement relative to the seat shell to raise and lower the shoulder belt portion of the child-restraint harness with respect to the bottom seat portion to harness small-sized children and large-sized children in a restrained position in the seat shell.

US 6,030,047 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4 and 9-15 is confirmed.

Claims 1-3 and 8 are cancelled.

New claims 42-50 are added and determined to be patentable.

Claims 5-7 and 16-41 were not reexamined.

42. *A child-restraint seat comprising*
*a seat shell including a bottom seat portion and a back support portion, the seat shell being adapted to be coupled to a vehicle seat by a seat anchor coupled to the vehicle,*
*a child-restraint harness coupled to the seat shell, and*
*a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell, the harness-control panel being positioned to lie spaced from and in front of a front surface of the back support portion to cause a child seated in the seat shell to rest against the harness-control panel.*

43. *A child-restraint seat comprising*
*a seat shell including a bottom seat portion and a back support portion, the seat shell being adapted to be coupled to a vehicle seat by a seat anchor coupled to the vehicle,*
*a child-restraint harness coupled to the seat shell, and*
*a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell, the harness-control panel being positioned to lie in front of a front surface of the back support portion to cause a child seated in the seat shell to rest against the harness-control panel,*
*wherein the harness-control panel includes a back plate formed to include first and second spaced-apart slots defining the belt-receiving opening, the shoulder belt portion of the child-restraint harness includes first and second shoulder belts, the back support portion is positioned to lie at an angle to the bottom seat portion and formed to include first and second slanted channels aligned in spaced-apart diverging relation to lie behind the back plate so that the first shoulder belt passes through the first slot and first slanted channel and the second shoulder belt passes through the second slot and second slanted channel during up and down movement of the harness-control panel relative to the seat shell and wherein the back support portion is formed to include two guide slots arranged in spaced-apart relation to position the first and second slanted channels therebetween, the harness-control panel further includes two support arms coupled to the back plate, and each of the support arms is arranged to extend through one of the guide slots.*

44. *A child-restraint seat comprising*
*a seat shell including a bottom seat portion and a back support portion, the seat shell being adapted to be coupled to a vehicle seat by a seat anchor coupled to the vehicle,*
*a child-restraint harness coupled to the seat shell, and*
*a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell, the harness-control panel being positioned to lie in front of a front surface of the back support portion to cause a child seated in the seat shell to rest against the harness-control panel,*
*wherein the harness-control panel includes a back plate formed to include first and second spaced-apart slots defining the belt-receiving opening, the shoulder belt portion of the child-restraint harness includes first and second shoulder belts, the back support portion is positioned to lie at an angle to the bottom seat portion and formed to include first and second slanted channels aligned in spaced-apart diverging relation to lie behind the back plate so that the first shoulder belt passes through the first slot and first slanted channel and the second shoulder belt passes through the second slot and second slanted channel during up and down movement of the harness-control panel relative to the seat shell,*
*wherein the harness-control panel further includes a headrest provided in an upper portion of the back plate above the first and second spaced-apart slots and adapted to extend above an upper edge of the back support portion upon removal of the first and second shoulder belts from the first and second spaced-apart slots and the first and second slanted channels and movement of the harness-control panel to a highest position relative to the seat shell and*
*wherein the first and second spaced-apart slots are located in a position below the headrest to lie in spaced-apart relation to the first and second slanted channels upon movement to the harness-control panel to the highest position relative to the seat shell.*

45. *A child-restraint seat comprising*
*a seat shell including a bottom seat portion and a back support portion, the seat shell being adapted to be coupled to a vehicle seat by a seat anchor coupled to the vehicle,*
*a child-restraint harness coupled to the seat shell, and*
*a harness-control panel formed to include a belt-receiving opening receiving a shoulder belt portion of the child-restraint harness, the harness-control panel being mounted on the seat shell for up and down movement relative to the seat shell to raise and lower the shoulder* belt portion of the child-restraint harness with respect to the bottom seat portion to harness small-sized children and large-sized children in a restrained position in the seat shell, the harness-control panel being positioned to lie in front of a front surface of the back support portion to cause a child seated in the seat shell to rest against the harness-control panel and wherein the back support portion of the seat shell is positioned to lie at an angle to the bottom seat portion and formed to include a guide slot extending therethrough and the harness-control panel includes a back plate formed to include the belt-receiving opening and arranged to lie adjacent to a front surface of the seat shell to cause a child seated in the seat shell to rest against the back plate and a support arm coupled to the back plate and arranged to extend through the guide slot formed in the back support portion and reciprocate up and down therein as the back plate moves up and down relative to the back support portion between a low position adapted to suit a small-sized child and a higher position adapted to suit a larger-sized child.

46. The child-restraint seat of claim 45, wherein the back support portion is also formed to include a slanted channel oriented to lie at an angle to the guide slot and arranged to receive the portion of the child-restraint harness therein and lie in communication with the belt-receiving opening formed in the back plate to enable movement of the portion of the child-restraint harness in the belt-receiving opening formed in the back plate and the slanted channel formed in the back support portion during up and down movement of the back plate relative to the seat shell.

47. The child-restraint seat of claim 46, wherein the slanted channel in the back support portion has a nominal width and the belt-receiving opening in the back plate is a slot having a length that is greater than the nominal width of the slotted channel.

48. The child-restraint seat of claim 45, wherein the back support portion is formed to include two spaced-apart guide slots extending therethrough and the harness-control panel includes two support arms coupled to the back plate and each support arm is arranged to extend through one of the guide slots.

49. The child-restraint seat of claim 45, wherein the harness-control panel includes first and second wing members coupled to opposite edges of the back plate and positioned to lie in spaced-apart relation to one another and the support arm is also coupled to one of the first and second wing members.

50. The child-restraint seat of claim 45, wherein the seat shell further includes a vertical back rib appended to a back surface of the back support portion and wherein the vertical back rib is formed to include the guide slot.

* * * * *